INVENTORS
LEON YABLONSKI
JAMES W. STROUSE

ATTORNEYS

INVENTORS
LEON YABLONSKI
JAMES W. STROUSE

ATTORNEYS

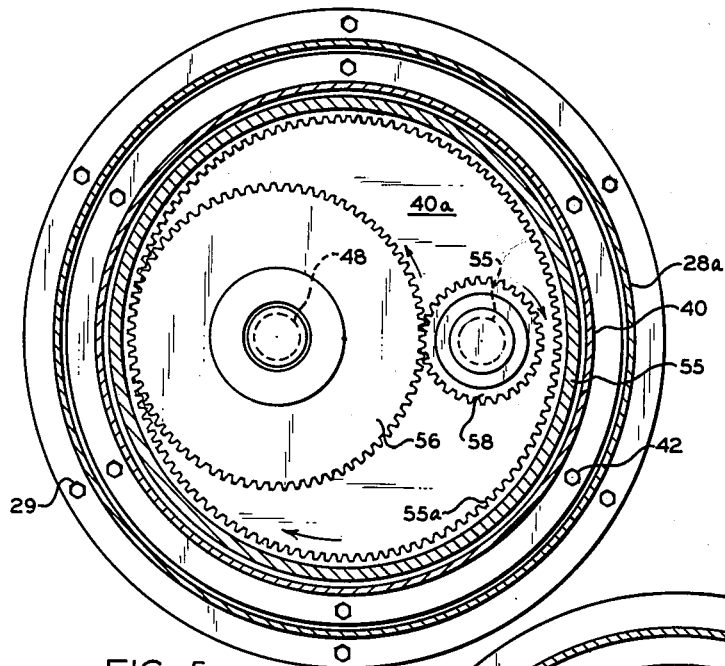
FIG. 5
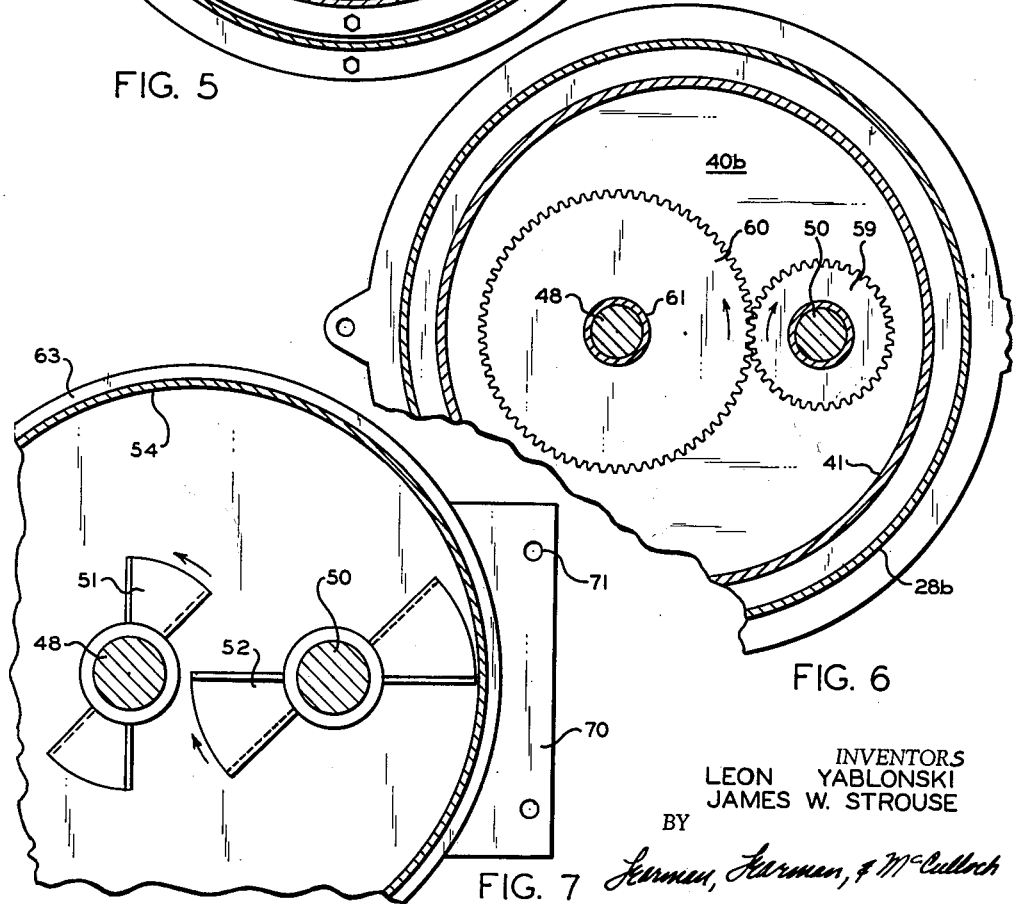
FIG. 6
FIG. 7
INVENTORS
LEON YABLONSKI
JAMES W. STROUSE
ATTORNEYS

United States Patent Office 3,075,746
Patented Jan. 29, 1963

3,075,746
MIXER FOR EXPLOSIVE MATERIALS
Leon Yablonski and James W. Strouse, Saginaw, Mich., assignors to Baker Perkins Inc., Saginaw, Mich., a corporation of New York
Filed July 10, 1958, Ser. No. 747,760
3 Claims. (Cl. 259—102)

This invention relates to mixers and particularly to mixers for explosive materials such as high energy fuels which must be handled with great care.

It is an absolute requisite of mixers for such materials that a truly homogenous mixture of the various components be achieved since, if globs of certain components remain in the mixture and are permitted to harden or cure, a potentially explosive condition exists after the mixture is removed in which the globs of material could initiate a reaction which explodes the whole of the mixture. Thus it is highly desirable that the mixer blades or paddles sweep the entire surface of the bottom and sides of the mixing bowl and that there be no "dead" spots in the bowl during the mixing operation.

It is a principal object of the present invention to design a mixer which meets these requirements and moves all of the material in the bowl with a mixing motion during the mixing operation.

Briefly, the invention concerns a mixing bowl in which a generally centrally disposed mixer and an outer mixer are operable, and preferably includes means for rotating each of the mixers about its own axis, and means for moving both of the mixers orbitally in a circumferential path. Intersecting, spirally shaped mixer blades are desirably employed which are of such diameter and height that they sweep virtually the entire volume of the bowl.

A further object of the invention is to provide a mixer of the character described which can employ a stationary, jacketed bowl of a type which can be mechanically raised and lowered relative to the mixer blades, and readily removed from and replaced in the machine.

Another object of the invention is to provide, in a mixing machine of the type described, an outer mixer which revolves at a greater speed than the generally centrally disposed mixer and in synchronism therewith.

Still a further object of the machine is to provide a mixing machine for materials which must be handled with great care which is efficient and reliable in operation and can be simply constructed and assembled so that it can be economically supplied.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

In the drawings:

FIGURE 5 is a sectional, plan view taken on the line 5—5 of FIGURE 3;

FIGURE 6 is a sectional, plan view taken on the line 6—6 of FIGURE 3;

FIGURE 7 is a sectional, plan view taken on the line 7—7 of FIGURE 3.

Figure 1:
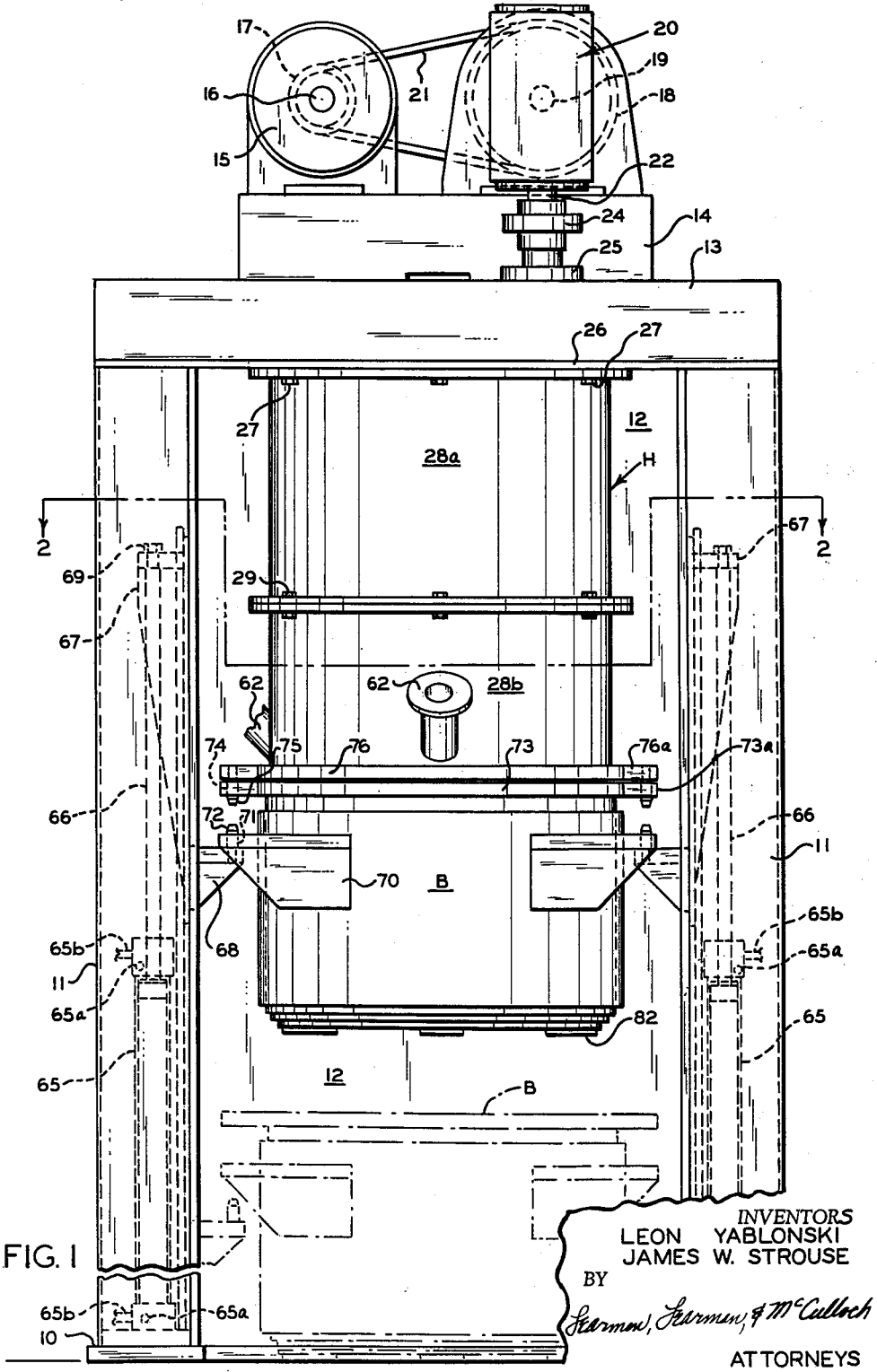
FIGURE 1 is a front elevational view of the mixing machine, the diagrammatic lines indicating a lowered position of the bowl handling mechanism and bowl.
Figure 2:
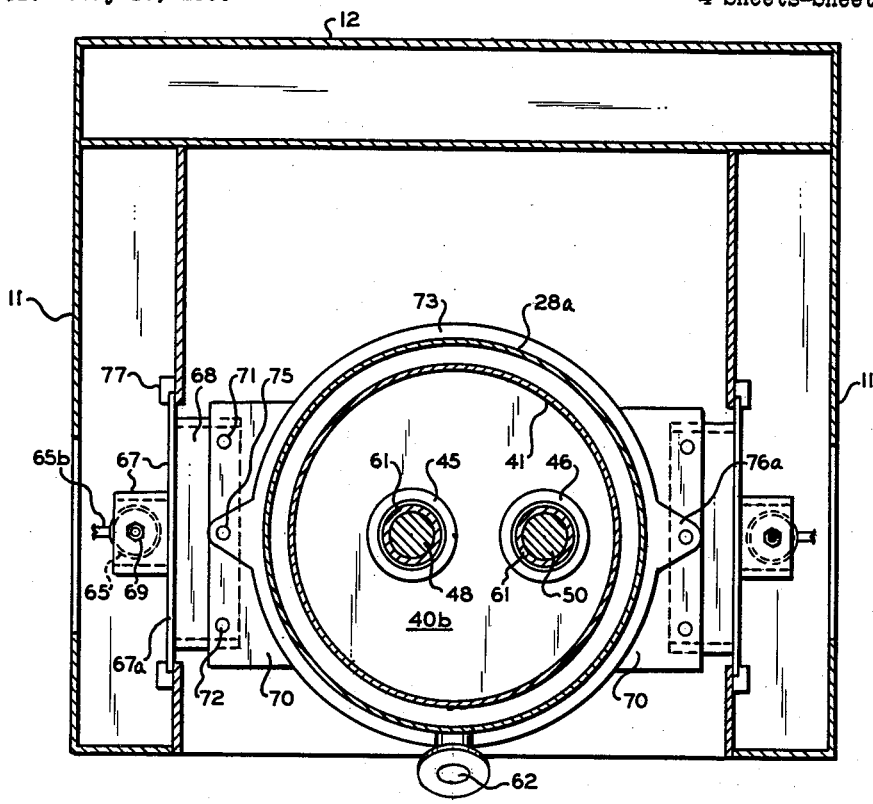
FIGURE 2 is a sectional, plan view taken on the line 2—2 of FIGURE 1.

Referring now more particularly to the accompanying drawings, a mixing machine is depicted which has a base 10 supporting upright, side wall casings 11, a rear wall casing 12, and a top wall casing 13. A bowl assembly which may be said to include a housing H and bowl B is supported within the casings in a manner to be described.

Provided on the top wall casing 13 of the frame of the machine on a platform or drive support 14 is an explosion proof motor 15 having an armature shaft 16 mounting a drive pulley 17 as shown. The pulley 17 is connected to a pulley 18 mounted fast on the input shaft 19 of a speed reducer 20 through a belt 21, and the output shaft 22 of a reducer 20 is connected to a drive shaft 23 by a coupling 24. Drive shaft 23 extends vertically through top wall casing 13 and is journaled in the bearing 25 provided therein.

Fixed under top wall casing 13 is a flange 26 to which is bolted (as at 27) an annular housing H formed of an upper section 28a and a lower section 28b secured together by bolts 29 or the like. A shaft 30 is journaled concentrically with the housing H in a bearing 31 fixed by the top wall 13 and a pin 32, extending through an opening 33 in the shaft and openings 34 in the bearing, holds the shaft 30 in fixed position.

Keyed on the lower end of shaft 23, and maintained in axially fixed position thereon, is a pinion 35 which is in mesh with internal teeth 36 which are provided on an annular carrier C. The carrier C, which is concentrically mounted for rotation on shaft 30, includes the annular gear section 37 fixed to a hub section or upper end wall 38 which is journaled on a bearing 39 on shaft 30. Dependent annular sections 40 and 41 which are bolted together as at 42, or secured in some other acceptable manner, also form a part of the carrier C and are fixed to the hub portion 38. The carrier C is supported from the upper wall 13 in any suitable manner and in the instant case it will be noted that flanges 38a are provided on the hub portion 38 and the shaft 30 is shouldered as at 30a in order to achieve a design in which there is a minimum of relatively revolving contact surface.

Provided on each annular section 40 and 41 of the depending carrier C are walls 40a and 40b respectively which have tubular bearing retainers 43, 44, 45, and 46 thereon. Bearings 47 mounted in the retainers 43 and 45 journal a generally centrally disposed shaft 48 which is offset from the axis or center line of shaft 30 and the axis of rotation "a" of the carrier C. Similarly bearings 49 which are mounted in the retainers 44 and 46 support a shaft 50 which is in diametric disposition with the shaft 48 and axis of rotation of the carrier C but is spaced a greater distance radially outward of the axis of rotation "a" of the carrier C than is shaft 48. It will be seen that the shaft 48 is spaced from the center or axis of shaft 30 an axial distance "x" and the shaft 50 is spaced a greater axial distance "y" from the axis of rotation of carrier C in the opposite direction.

Mounted on the lower ends of the shafts 48 and 50 are helical blades 51 and 52 respectively which have intersecting paths of travel (see FIGURE 7), and it will be observed later that the direction of rotation of shafts 48 and 50 is such that the helical blades will tend to drive the material toward the bottom of the bowl B in which the blades are disposed a very slightly spaced distance above the bottom wall 53. The edge of blade 52 also passes very close to the side wall 54 of the bowl B in its rotation and tends to prevent material from accumulating thereon. With carrier C being revolved about its axis of rotation "a" by the pinion 35 as previously mentioned, the shafts 48 and 50 will have orbital rotation about the axis "a" with which bowl B is concentric.

It is also desirable to rotate shafts 48 and 50 about their own axes and this is very practically accomplished in the instant design by providing motion transmission means between the carrier C and the shafts 48 and 50 so that no separate drive need be provided. The problem of connection of a separate drive shaft to revolve shafts 48 and 50 from a motor or the like would clearly be a very difficult one in view of the orbital rotation of the shafts. Fixed on the lower end of shaft 30 and supported by shouldered portion 30b thereof is an internal ring gear 55 having teeth 55a in mesh with a pinion 56 which is rotatably journaled on the upper end of shaft 48 on a roller bearing 57.

The gear 56 is in mesh with a pinion 58 which is keyed on shaft 50 and accordingly, orbital rotation of shaft 48 and the gear 56, which it rotatably carries, causes the gear 56 to be driven by the teeth 55a and thus drive shaft 50 through gear 58. A gear 59 keyed on shaft 50 and in mesh with a gear 60 keyed on shaft 48 drives the shaft 48 at half the speed of shaft 50 and because there is a direct, synchronized driving relationship between shafts 48 and 50 the blades 51 and 52, which have intersecting paths of travel and rotate in opposite directions, never come into contact. It will be seen that spacers 61 are provided where required on shouldered portions of the shafts 48 and 50 to support the gears and bearings.

Various spouts 62 extending through the wall of the housing 28a may be provided as desired to permit materials to be fed into the bowl B and, if the mixing is to occur under pressure or in a vacuum, means will be provided for sealing off the supply tubes or spouts 62. The bowl B is a jacketed bowl and has a jacket 63 provided for its side wall 54 and a jacket 64 provided for its lower wall 53. It will be understood that a suitable thermally conductive fluid will be circulated through the jackets 63 and 64 to maintain the temperature levels desired. With the instant construction there need be no rotation of the bowl B and stationary fittings can be attached to the bowl B, once it is in position, for the supplying of and removal of the thermally conductive gas or liquid to the jacketed portions.

In order to facilitate removal of the bowl B, once its contents have been thoroughly mixed, suitable double acting fluid pressure cylinders 65 are provided within the side wall casings 11. The upper ends of the piston rods 66 of the cylinders 65 are secured to gusseted brackets 67 which have lift members or arms 68 at their lower ends, the upper ends of brackets 67 being secured in any acceptable manner to the piston rods 66 as with nuts 69. The bowls B mount brackets 70 with flanges 70a having spaced apart location openings 71 which are positioned to receive the locator pins 72 on lift arms 68. At its top end the bowl B is provided with a peripheral flange 73, having ears 73a with openings 74, for the reception of depending locator pins 75 provided in similar ears 76a on flange 76 which is formed on the lower end of housing H. The cylinders 65 may be actuated by an operator or could be automatically actuated by a timer gauging the mixing cycle. Common, double acting, fluid pressure cylinders are used which have solenoid valves operating to supply and egress a fluid under pressure from the cylinders in the usual manner. Such cylinders may have bleed openings 65a and air supply connections 65b. The casing walls 11 may be provided with guide members 77 receiving portions 67a of the brackets 67 and guiding brackets 67 in their reciprocatory travel.

Figure 3:
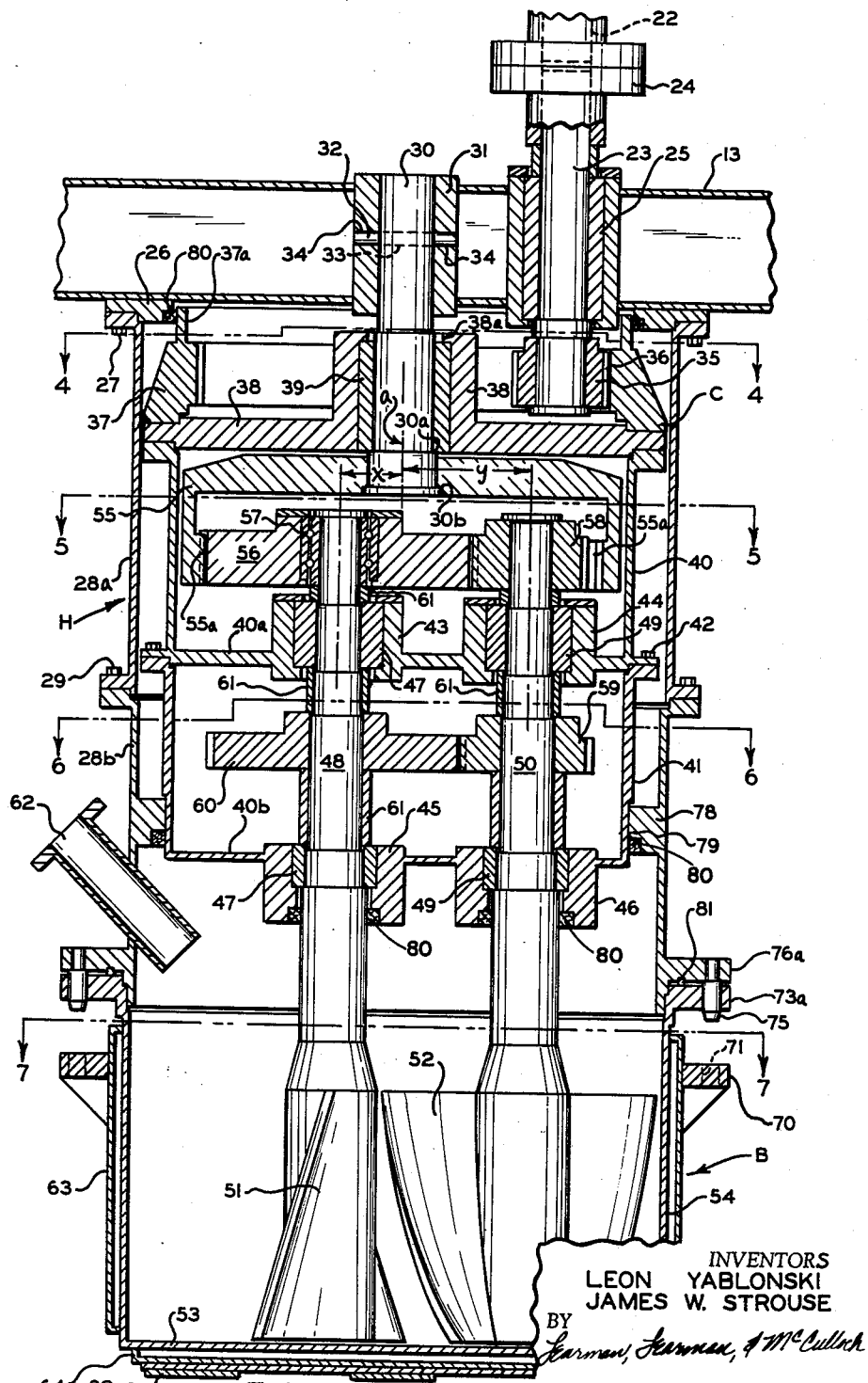
FIGURE 3 is a sectional, elevational view through the mixer shaft carrier housing and bowl.

It is important that the bowl B be protected from contaminants such as lubricants for the gears shown and also from any sparks or heated particles which, if they were to reach the mixture, would be very likely to explode it. Accordingly, the housing H is provided with an internal flange 78 snugly but rotatably receiving the lower end of the carrier C, which is reduced as at 79 to accommodate the flange. Further, a seal 80 is shown as provided between a flange portion 37a extendingly upwardly from gear 37 and the mounting flange 26, and other seals 80 are provided throughout the mixing machine as needed. Specifically, seals 80 are provided between member 45 and shaft 48, and between member 46 and shaft 50. Also a seal 80 is provided between carrier wall 79 and flange 78. Seals 81 (FIGURE 3) are carried by the flange 76, for instance, to keep the material to be mixed in the bowl.

In considering fully the mode of operation of the mixing machine it should be remembered that the machine will be on the order of seventeen feet in overall height and will mix explosive materials in an interchangeable bowl which may be on the order of four feet or more in diameter. Thus the bowl B, which has base plates 82 or the like, must be initially deposited by a suitable material handling truck or device and lift members 68 must be provided. It will be noted that the members 68, when in lowermost position, are below the flanges 70a sufficiently so that there is no interference from pins 71 when the bowl is moved into position below the housing H. When the lift brackets 68 are moved upwardly, upon the admittance of pressure fluid to the lower end of cylinders 65, pins 72 move up into the openings 71 in the brackets 70 on the bowl and the bowl B is lifted up into the position in which it is shown in solid lines in FIGURE 1, the dependent locating pins 75 entering the openings 74 in the bowl flange 73.

Figure 4:
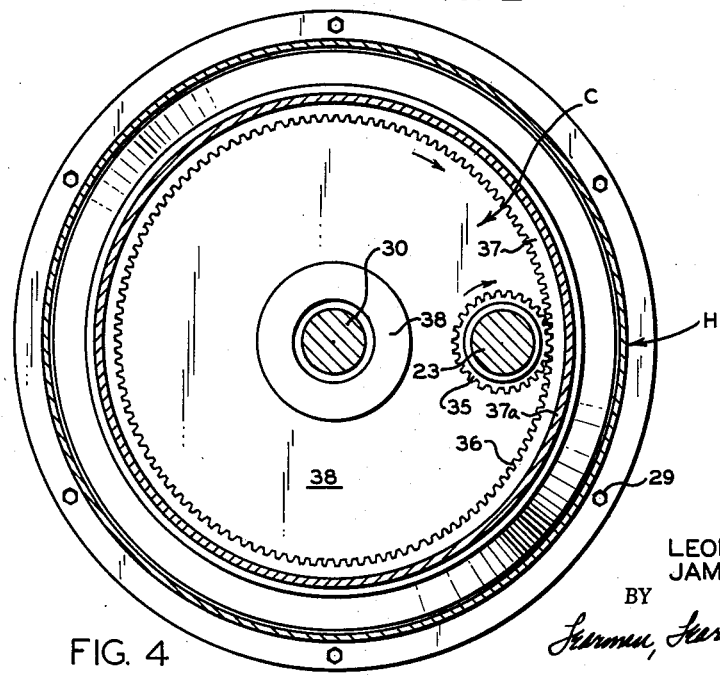
FIGURE 4 is a sectional, plan view taken on the line 4—4 of FIGURE 3.

With the bowl B now held in sealed relationship with the lower edge of housing H, by the cylinders 65, the motor 15 is energized to cause rotation of the carrier C and simultaneous orbital and axial rotation of the paddle or mixer shafts 48 and 50. Because shaft 48 is off center with respect to the axis "a" and center line or axis of the bowl B, no dead spot can occur under the blades 51 as would be the case if the shaft 48 were concentrically disposed within the bowl B. It is assumed that, with shaft 23 operating in a clockwise direction (see FIGURE 4), the carrier C is driven about its axis in a clockwise direction also, and shafts 48 and 50 are moved in clockwisely orbital paths. Clockwise orbital motion of gear 56, which is rotatable on shaft 48, causes it to be counterclockwisely spun about its own axis and accordingly, causes it to revolve gear 58 in a clockwise direction about its axis. Shaft 48 is, however, moved counterclockwisely by the gear 59 while it is moving in a clockwise orbital path. It should be apparent that virtually the entire volume of the mixer bowl B is swept by the blades 51 and 52, and no dead spots are created in the mixing movement in which globs of particular components will remain unmixed. When the mixing operation has been in progress for a sufficient length of time at a carefully controlled temperature, the motor 15 is deenergized and fluid pressure is introduced to the upper end of cylinders 65 to lower lift arms 68, and consequently the bowl B, to the position in which it is shown in diagrammatic lines in FIGURE 1. It can then be removed by a suitable materials handling unit and a new bowl B substituted.

The blades 51 and 52 and speeds of rotation of shafts 48 and 50 are so arranged that the blades 51 and 52 travel in intersecting paths but do not ever engage.

It should be apparent that we have perfected a greatly improved mixing machine which will be very well suited to the purpose for which it was designed. It is to be understood that various equivalent changes may be made in the various elements of the invention without departing from the spirit of the subjoined claims so long as equivalent results are obtained.

We claim:

1. In a mixer; a bowl assembly; a mixing carrier including a side wall closure and an end wall closure with at least a pair of mixer shafts extending axially from said end wall closure into said bowl assembly; one of said shafts being generally centrally disposed in said bowl assembly but off center with respect to the center of the bowl assembly and another mixer shaft being disposed further radially outward than said first shaft; mixer members on said shafts; means for revolving said carrier about an axis operably centrally aligned with the center of said bowl assembly and thereby moving said shafts generally orbitally about the general center of the bowl assembly; motion transmission means within said closures of the mixing assembly for revolving said shafts about their axes, with the mixer member on the generally central shaft sweeping in its path of rotation across the center of the powl assembly and the mixer member on the other shaft sweeping in its path of rotation adjacent the wall of the bowl assembly; and means in engagement between the carrier and bowl assembly for sealing the bowl assembly from contaminants.

2. In a mixer; a bowl; a carrier assembly including an end wall closure, with mixer shafts extending axially from said end wall closure into said bowl; one of said shafts being generally centrally disposed in said bowl but off center with respect to the center of the bowl and another mixer shaft being disposed further radially outward than said first shaft; mixer members on said shafts; means for revolving said assembly about an axis operably substantially centrally aligned with the center of said bowl and thereby moving said shafts generally orbitally about the general center of the bowl; motion transmission means for the carrier assembly isolated from the bowl by said end wall closure for revolving said shafts about their axes, with the mixer member on the generally central shaft sweeping in its path of rotation across the center of the bowl and the mixer member on the other shaft sweeping in its path of rotation adjacent the wall of the bowl; and means in engagement between said carrier assembly and bowl for sealing said bowl from contamination of its contents.

3. In a mixer; a bowl; a mixer carrier assembly including a side wall closure and end wall closures with mixer shafts extending axially from an end wall closure into said bowl; one of said shafts being generally centrally disposed in said bowl but off center with respect to the center of the bowl and another mixer shaft being disposed further radially outward than said first shaft; mixer members on said shafts; a fixed spindle generally centrally disposed relative to said assembly extending through the opposite end wall closure to support said assembly for rotation; means engaged with the periphery of said assembly for revolving said assembly about an axis operably centrally aligned with the center of said bowl and thereby moving said shafts generally orbitally about the general center of the bowl; and motion transmission means within said closures of the mixing assembly mounted rotatably on said spindle and driven by rotation of said assembly for revolving said shafts about their axes, with the mixer member on the generally central shaft sweeping in its path of rotation across the center of the bowl and the mixer member on the other shaft sweeping in its path of rotation adjacent the wall of the bowl.

References Cited in the file of this patent

UNITED STATES PATENTS

| | | |
|---|---|---|
| 553,554 | De Camp | Jan. 28, 1896 |
| 902,465 | Auchu | Oct. 27, 1908 |
| 1,175,530 | Kirchhoff | Mar. 14, 1916 |
| 1,438,856 | Read | Dec. 12, 1922 |
| 1,612,281 | Goetz | Dec. 28, 1926 |
| 1,733,516 | Rodin et al. | Oct. 29, 1929 |
| 1,913,189 | Carbonel | June 6, 1933 |
| 2,203,135 | Farrington | June 4, 1940 |
| 2,203,672 | Chester | June 11, 1940 |
| 2,808,239 | Reiffen | Oct. 1, 1957 |

FOREIGN PATENTS

| | | |
|---|---|---|
| 15,074 | Netherlands | Sept. 15, 1926 |